3,705,135
INHIBITING PREMATURE VULCANIZATION OF DIENE RUBBERS WITH N-THIOFORMAMIDES
Mark Dennis Wolfinger, Akron, Ohio, assignor to Monsanto Company, St. Louis, Mo.
No Drawing. Filed Aug. 26, 1970, Ser. No. 67,259
Int. Cl. C08f 27/06
U.S. Cl. 260—79.5 B — 17 Claims

ABSTRACT OF THE DISCLOSURE

Certain N-thioformamides are used to inhibit premature vulcanization of vulcanizable elastomers.

FIELD OF THE INVENTION

This invention relates to methods of inhibiting premature vulcanization of vulcanizable elastomers and to improved elastomeric compositions. More particularly, the invention relates to certain N-thioformamides which possess special properties for inhibiting premature vulcanization.

BACKGROUND OF THE INVENTION

In the manufacture of vulcanized rubber products, crude rubber is combined with various other ingredients such as fillers, accelerators, and antidegradants to alter and improve processing of the rubber and to improve the properties of the final product. The crude rubber is put through several steps in the plant before it is ready for the final step of vulcanization. Generally the rubber is mixed with carbon black and other ingredients except the vulcanizing agent and accelerator. Then the vulcanizing and accelerating agents are added to this masterbatch in a Banbury mixer or a mill. Scorching, viz, premature vulcanization, can occur at this stage of the processing, during the storage period before vulcanizing, and during the actual vulcanization. After the vulcanizing and accelerating agents are added, the mixture of crude rubber is ready for calendering or extruding and vulcanization. If premature vulcanization occurs during the storage of the crude mixture or during processing prior to vulcanization, the processing operations cannot be carried out because the scorched rubber is rough and lumpy, consequently useless. Premature vulcanization is a major problem in the rubber industry and must be prevented in order to allow the rubber mix to be preformed and shaped before it is cured or vulcanized.

The development of high pH furnace blacks which lack the inherent inhibiting effect of the acidic channel blacks and the popularity of certain phenylenediamine antidegradants which promote scorching have placed increasingly stringent demands on the accelerator system. The efficiency of thiamides for inhibiting prevulcanization is described by Coran and Kerwood in co-pending application Ser. No. 714,445 filed Mar. 20, 1968. The compound N-(fluorodichloromethylthio)formamide and its pesticidal properties were described by Kuhle et al., U.S. Pat. 3,344,153, Sept. 26, 1967. I have discovered a new class of N-(thio)formamides having special properties for inhibiting prevulcanization of vulcanizable elastomers.

SUMMARY OF THE INVENTION

The method of inhibiting premature vulcanization according to the present invention comprises incorporating into vulcanizable elastomer a vulcanizing agent and in amount effective to inhibit premature vulcanization an N-(thio)formamide of the formula

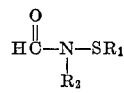

wherein $R_1$ is alkyl, aralkyl, aryl or cycloalkyl and $R_2$ is hydrogen, alkyl, aralkyl, aryl or cycloalkyl but $R_1$ is preferably aryl or cycloalkyl. Aryl is used in the usual sense to mean a univalent organic radical where the free valence belongs to an aromatic carbocyclic nucleus and not to a side chain. The term includes radicals substituted in the carbocyclic nucleus by halogen, alkyl, alkoxy or nitro, for example, p-chlorophenyl, p-nitrophenyl, o-chlorophenyl, p-anisyl, p-ethoxyphenyl, p-butoxyphenyl, m-chlorophenyl, p-bromophenyl and pentachlorophenyl, but electronegative substituents are preferably absent. Thus, aryl radicals composed solely of carbon and hydrogen are preferred, examples of which are phenyl, o-tolyl, m-tolyl, p-tolyl, xylyl, p-tert-butylphenyl, p-ethylphenyl, o-isopropylphenyl and diethylphenyl. Alkyl means univalent aliphatic radicals of the series $C_nH_{2n+1}$ preferably free of electronegative substituents. Primary, secondary and tertiary alkyls are included, but primary and secondary alkyl hydrocarbons of 1 to 20 carbon atoms are the preferred alkyl radicals. The aryl substituted alkyl or aralkyl class are illustrated by benzyl, 2-phenethyl, 1-phenethyl, 3-phenylpropyl, 2-phenylpropyl and 4-phenylbutyl. Aralkyl hydrocarbon radicals of 7 to 10 carbon atoms are preferred. The term cycloalkyl refers to a monovalent radical derived by removal of one hydrogen atom from a cyclic alphatic hydrocarbon and includes cycloalkyl radicals of 5 to 12 carbon atoms in the ring. Examples of cycloalkyl are cyclopentyl, cyclohexyl, methylcyclohexyl, dimethylcyclohexyl, cyclooctyl, cyclodecyl and cyclododecyl. Examples of alkyl are methyl, ethyl, propyl, isopropyl, butyl, sec-butyl, isobutyl, tert-butyl, amyl, hexyl, octyl, decyl, dodecyl and eicosyl.

Examples of compounds conforming to the aforesaid formula are:

N-(phenylthio)formamide
N-(2,5-dimethylphenylthio)formamide
N-(p-tolylthio)formamide
N-(benzylthio)formamide
N-(cyclopentylthio)formamide
N-(cyclohexylthio)formamide
N-(cyclooctylthio)formamide
N-(butylthio)formamide
N-(ethylthio)formamide
N-phenylthio-N-methylformamide
N-cyclohexylthio-N-methylformamide
N-benzylthio-N-methylformamide
N-methylthio-N-dodecylformamide
N-phenylthio-N-t-butylformamide
N-cyclohexylthio-N-t-butylformamide
N-benzylthio-N-t-butylformamide
N-pentylthio-N-t-butylformamide
N-ethylthio-N-t-butylformamide
N-phenylthio-N-cyclohexylformamide N-m-tolylthio-N-cyclohexylformamide
N-2,4-dimethylphenylthio-N-cyclohexylformamide
N-benzylthio-N-cyclohexylformamide
N-cyclopentylthio-N-cyclohexylformamide
N-cyclohexylthio-N-cyclohexylformamide
N-methylthio-N-cyclohexylformamide
N-ethylthio-N-cyclohexylformamide
N-isopropylthio-N-cyclohexylformamide
N-dodecylthio-N-cyclohexylformamide
N-phenylthio-N-t-octylformamide
N-cyclohexylthio-N-t-octylformamide
N-phenylthio-N-isopropylformamide
N-cyclohexylthio-N-isopropylformamide
N-methylthioformanilide
N-phenylthioformanilide
N-cyclohexylthioformanilide
N-benzylthioformanilide
N-hexylthioformanilide Rubber stocks containing delayed-action accelerators can be used in the process of this invention. Cheaper, more scorchy accelerators can also be used with an excellent degree of improvement. The improved vulcanizing process of this invention can be used advantageously to process stocks containing furnace blacks as well as stocks containing other types of blacks and fillers used in rubber compounding. The invention is also applicable to gum stocks.

The invention is applicable to rubber mixes containing sulfur-vulcanizing agents, peroxide-vulcanizing agents, organic accelerators for vaulcanization, and antidegradants. For the purposes of this invention, sulfur-vulcanizing agent means elemental sulfur or sulfur containing vulcanizing agent, for example, an amine disulfide or a polymeric polysulfide. The invention is applicable to vulcanization accelerators of various classes. For example, rubber mixes containing the aromatic thiazole accelerators which include benzothiazyl - 2 - monocyclohexylsulfenamide, 2-mercaptobenzothiazole, 2,2'-dithiobisbenzothiazole, N-tert-butyl-2-benzothiazolesulfenamide, 2 - benzothiazolyl diethyldithiocarbamate, and 2-(morpholinothio)benzothiazole can be used. Amine salts of mercaptobenzothiazole accelerators, for example, the t-butyl amine salt of mercaptobenzothiazole, like salts of morpholine, and 2,6-dimethylmorpholine, can be used in the invention. Thiazole accelerators other than aromatic can be used. Stocks containing accelerators, for example, the tetramethylthiuram disulfide, tetramethylthiuram monosulfide, aldehyde amine condensation products, thiocarbamyl sulfenamides, thioureas, meal dithiocarbamates, alkyldithiocarbamates, hexamethylenetetramine, xanthates, and guanidine derivatives, are substantially improved using the process of the invention. Examples of thiocarbamylsulfenamide accelerators are shown in U.S. Pats. 2,381,392, Smith assigned to Firestone, 2,388,236, Cooper assigned to Monsanto, 2,424,921, Smith assigned to Firestone, and British Pat. 880,912, Dadson assigned to Imperial Chemical Industries Limited. The invention is applicable to accelerator mixtures. The invention is application to stocks containing amine antidegradants. Rubber mixes containing antidegradants, for example, N-1,3-dimethylbutyl - N' - phenyl-p-phenylenediamine, N,N'-bis(1,4-dimethylpentyl-p)-phenylenediamine, and other phenylenediamines, ketone, ether, and hydroxy antidegradants and mixtures thereof, are substantially improved using the process of the invention. Mixtures of antidegradants, for example, a mixture of N-1,3-dimethylbutyl-N'-phenyl-p-phenylenediamine and N,N'-bis-(1,4-dimethylpentyl)-p-phenylenediamine, furnish a much improved final product when used with the inhibitors of this invention.

The inhibitors of the invention can be used in natural and synthetic rubbers and mixtures thereof. Synthetic rubbers that can be improved by the process of this invention include cis-4-polybutadiene, butyl rubber, ethylene-propylene terpolymers, polymers of 1,3-butadiene, for example, 1,3-butadiene itself and of isoprene, copolymers of 1,3-butadiene with other monomers, for example, styrene, acrylonitrile, isobutylene, and methyl methacrylate. In general, stocks prepared with any sulfur-vulcanizable elastomer are improved which class includes chloroprene rubber and sulfur-vulcanizable urethane rubber. Diene rubbers are preferred and elemental sulfur is the preferred vulcanizing agent. Another sulfur vulcanizing agent is illustrated by 4,4'-dithiodimorpholine.

An alternative vulcanizing system applicable to sulfur vulcanizable rubber involves use of an organic peroxide vulcanizing agent. For example, dicumyl peroxide and other organic peroxides are listed in Materials and Compounding Ingredients for Rubber and Plastics compiled by the editors of Rubber World and printed by Publisher's Printing Co. 1965. It appears under the section "Vulcanizing and Curing Agents" beginning page 139. Such conventional organic peroxide vulcanizing agents are utilizable with the new inhibitors.

The quantity of inhibitor to be used in any particular application depends upon the components in the stock and the processing conditions to which the stock is subjected prior to vulcanization. The compounder can readily determine the optimum amount for his particular requirements by preparing stocks with various amounts of inhibitor and determining the scorch delay. The quantity usually is between 0.05 to 5.0 parts inhibitor per 100 parts elastomer. Concentrations from 0.10 to 3.0 parts per hundred are preferred. The higher quantities are used in the more scorchy stocks, for example, stocks containing scorchy carbon blacks and amine antidegradants or in stocks which are subjected to high temperatures for times longer than normally encountered. Amounts within the range of 0.5 to 1.5 parts of inhibitor per 100 parts elastomer exert a powerful inhibiting effect.

The N-thioformamides are prepared by reacting the corresponding sulfenyl halide with a formamide. The products are also formed by converting the formamide to a salt for which purpose butyl lithium or sodium hydride are satisfactory reactants. The lithium or sodium salt is then reacted with the sulfenyl halide. Isolation of an alkali metal salt of the formamide assures the presence of a form of the amide strongly reactive with the sulfenyl halide. The products are preferably formed by condensation of the sulfenyl halide with a formamide having at least one hydrogen on the amide nitrogen in the presence of a powerful hydrogen halide acceptor, examples of which are collidine and diethyl isopropylamine. The reaction medium is preferably benzene or dioxane or a highly polar solvent, for example, dimethylformamide or dimethylsulfoxide.

DESCRIPTION OF PREFERRED EMBODIMENTS
EXAMPLE 1

N-cyclohexyl-N-(phenylthio)formamide

The sodium salt of N-cyclohexyl formamide is prepared by mixing N-cyclohexyl formamide (12.7 grams, 0.10 mole) and 25% sodium methoxide methanol solution (21.6 grams, 0.1 mole) in 50 ml. of methanol at room temperature. The methanol is removed under reduced pressure and the sodium salt residue is recovered and dried. The sodium N-cyclohexyl formamide is slurried in 150 ml. of hexane and cooled to 5° C. Benzenesulfenyl chloride (0.10 mole) in approximately 100 ml. of hexane is added slowly over a 45 minute period to the reaction mixture. The mixture is stirred at 5° C. for 1 hour, permitted to slowly warm to room temperature and allowed to stand overnight. Sodium chloride is separated from the reaction mixture by filtration. The hexane is removed under reduced pressure with a rotary evaporator. The residue is dissolved in a small amount of hexane and the soluble hexane layer is decanted from a small amount of oil which is discarded. The hexane soluble fraction is eluted through a hexane-silica gel chromatography column to separate the product. N-cyclohexyl-N-(phenylthio)formamide, a liquid, is recovered substantially pure as indicated by gas chromatography and nuclear magnetic resonance spectral analysis.

EXAMPLE 2

N-tert-butyl-N-(cyclohexylthio)formamide

The lithium salt of tert-butyl formamide is prepared by adding 0.15 mole of butyl lithium over a 15 minute period to a solution of tert-butyl formamide (15.15 grams, 0.15 mole) in 75 ml. of hexane. The reaction mixture is cooled to 5° C. and 0.15 mole cyclohexanesulfenyl chloride in approximately 100 ml. of hexane is added over a two hour period. The mixture is stirred for one hour at 5° C. and then slowly warmed to room temperature. Lithium chloride is removed from the reaction mixture by filtration and washed with hexane. The hexane in the filtrate containing the product is removed by vacuum stripping. The residue is redissolved in hexane and eluted through a hexane-silica gel chromatography column to obtain 7.0 grams of liquid product (46.5% yield). Nuclear magnetic resonance spectral analysis confirms that the product is essentialy N-tert-butyl-N-(cyclohexylthio)formamide. The purity is approximately 90% with the main impurity being tert-butyl formamide.

EXAMPLE 3

N-tert-butyl-N-(phenylthio)formamide

Benzenesulfenyl chloride (0.20 mole) is added at room temperature over a 50 minute period to a solution containing tert-butyl formamide (20.2 grams, 0.20 mole) and pyridine (18.2 grams, 0.20 mole) in 100 ml. of dimethyl formamide. The exothermic reaction caused the reaction temperature to rise to 40° C. After stirring the mixture for 1 hour, 1 liter of water is added. An orange oil which separates is recovered in 200 ml. of chloroform. The water layer is extracted with 100 ml. of chloroform and the chloroform extract combined with the other chloroform portion. The combined chloroform solution is wash four times with 300-ml. portions of water and dried over sodium sulfate. The chloroform is removed under reduced pressure. The residue is distilled to give N-tert-butyl-N-(phenylthio)formamide (14.9 grams, 36% yield), a pale yellow liquid boiling at 0.8 mm. 95–100° C.

EXAMPLE 4

N-(phenylthio)formamide

A solution containing 0.20 mole of formamide and 0.20 mole of benzenesulfenyl chloride in 100 ml. of dioxane is refluxed with stirring for 2 hours. The reaction mixture is cooled to room temperature and stirred overnight. The dioxane is removed by vacuum stripping. Upon standing, 9 grams of product crystallizes from the oily residue. A quantity of phenyl disulfide is removed by washing with cold hexane. N-(phenylthio)formamide recrystallized from hexane melts at 101.5–102.0° C. Identification of the product is confirmed by vapor phase chromatography and nuclear magnetic resonance spectral analysis. Chemical analysis gives 55.04% C, 4.60% H, 9.12% N compared to 54.88% C, 4.61% H and 9.14% N calculated for $C_7H_7NOS$.

Alternatively, a solution of 0.22 gram mole of benzene-sulfenyl chloride in 50 ml. of benzene is added at 10° C. to a solution of 0.3 gram mole (13.5 g.) of formamide and 0.22 gram mole (27.0 g.) of collidine in 200 ml. of benzene. After 1 hour at room temperature the reaction mixture is poured into water, the organic layer separated, the solvent removed therefrom by distillation and the residue poured into ice water. The water mixture is extracted with benzene, the benzene extract washed with water, concentrated by distillation and the residue allowed to stand. The product crystallizes from the oily residue.

EXAMPLE 5

N-methyl, N-(4-chlorophenylthio)formamide

A solution of 0.3 gram mole (43.3 g.) of 4-chlorobenzenesulfenyl chloride in 300 ml. of benzene is added at about 10° C. to a solution of 0.3 gram mole (18.0 g.) of N-methylformamide and 0.3 gram mole (36.3 g.) of collidine in 250 ml. of benzene over a period of about 30 minutes. The reaction mixture is then allowed to stand for about 1 hour at room temperature after which it is filtered, washed with 200 ml. of water, with three 200 ml. portions of 5% hydrochloric acid, and finally with three 200 ml. portions of water. The benzene solution is then dried over sodium sulfate and the benzene removed by distillation. The residue is eluted through a hexane-silica gel chromatography column to isolate the product. Identification of the liquid product as N-methyl,N-(4-chlorophenylthiol)formamide is confirmed by nuclear magnetic resonance spectral analysis.

EXAMPLE 6

N-(phenylthio)formanilide

In the procedure of Example 5 there is substituted an equivalent proportion of formanilide in place of N-methylformamide and an equivalent proportion of benzenesulfenyl chloride in place of 4-chlorobenzenesulfenyl chloride. Identification of N-(phenylthio)formanilide, a liquid, is confirmed by nuclear magnetic resonance spectral analysis.

EXAMPLE 7

N-(4-chlorophenylthio)formanilide

In the procedure of Example 5 there is substituted an equivalent proportion of formanilide in place of N-methyl formamide. Identification of N - (4 - chlorophenythio)formanilide, a liquid, is confirmed by nuclear magnetic spectral analysis.

The inhibitor activity of the compounds is illustrated by preparing sulfur-vulcanizable stocks and comparing the properties of the stocks with and without the inhibitors present.

The cure characteristics of the stocks are determined at the indicated temperature by a Monsanto Oscillating Disk Rheometer. The time, $t_2$, required for a rise of two Rheometer units above the minimum reading and the time, $t_{90}$, required to obtain 90% of the Rheometer maximum torque is recorded. The difference of the two times, $t_{90}-t_2$, is a measure of the cure rate of the stocks. The Rheometer maximum torque is the measure of the state of cure or the amount of cross-linking which has taken place during vulcanization. The time required to achieve optimum cure is determined from the Rheometer data and vulcanizates are prepared by heating stocks in a press for the indicated time. The scorch properties of the stocks are determined by a Mooney plastometer and the time ($t_5$) in minutes for the Mooney reading to rise five points above the minimum viscosity is recorded. Longer times on the Mooney scorch test indicate greater processing safety and inhibitor activity.

A natural rubber masterbatch is prepared comprising:

| Ingredients: | Parts by weight |
| --- | --- |
| Smoked sheets | 100.0 |
| Zinc oxide | 3.0 |
| Stearic acid | 2.0 |
| Carbon black ISAF | 45.0 |
| Hydrocarbon softener | 5.0 |
| Total | 155.0 |

Vulcanizable stocks are prepared (all parts are by weight) by incorporating vulcanizing agents, accelerator, antidegradant and inhibitor with portions of the masterbatch. The stocks are then tested as previously described.

| Stock | A | B |
|---|---|---|
| Masterbatch | 155.0 | 155.0 |
| N-tert-butyl benzothiazolesulfenamide | 0.5 | 0.5 |
| Sulfur | 2.0 | 2.0 |
| N-1,3-dimethylbutyl-N'-phenyl-p-phenylenediamine | 2.0 | 2.0 |
| N-cyclohexyl-N-(phenylthio)formamide | | 0.5 |
| Mooney scorch at 121° C.: | | |
| $t_5$ | 27.3 | 48.3 |
| Percent increase in scorch delay | | 76 |
| Rheometer data at 144° C.: | | |
| $t_2$ | 6.8 | 10.5 |
| $t_{90}-t_2$ | 13.5 | 14.4 |
| Maximum torque | 73.0 | 76.8 |
| Stress-strain data: | | |
| 300% modulus, p.s.i. | 1,660 | 1,660 |
| Ultimate tensile strength, p.s.i. | 3,900 | 3,800 |

The $t_2$ of Stock B in which N-cyclohexyl-N-(phenylthio)formamide is replaced by N-phenylthioformanilide is 10.9 minutes, which represents an increase of about 62% over $t_2$ of Stock A. The increase when the inhibitor is N-(p-chlorophenylthio)formanilide or N-(p-chlorophenylthio)-N-methylformamide is 37%.

The present increase in the Mooney reading obtained in similar natural rubber stocks containing other inhibitors of this invention is shown below:

|  | Percent increase in Mooney reading at 121° C. |
|---|---|
| N-(phenylthio)formamide | 198 |
| N-tert-butyl-N-(cyclohexylthio)formamide | 199 |
| N-tert-butyl-N-(phenylthio)formamide | 139 |

The inhibitor activity of the compounds of this invention in synthetic rubber stocks is illustrated in a styrene-butadiene rubber masterbatch.

SBR Masterbatch

| | Parts by weight |
|---|---|
| Oil-extended SBR | 137.5 |
| Carbon black ISAF | 65.0 |
| Zinc oxide | 3.0 |
| Stearic acid | 1.0 |
| Hydrocarbon softener | 1.5 |
| Total | 208.0 |

Vulcanizable stocks are prepared by incorporating curatives, antidegradant and inhibitor with portions of the masterbatch.

| Stock | C | D | E |
|---|---|---|---|
| SBR masterbatch | 208.0 | 208.0 | 208.0 |
| N-tert-butyl benzothiazolesulfenamide | 1.0 | 1.0 | 1.0 |
| Sulfur | 2.0 | 2.0 | 2.0 |
| N-1,3-dimethylbutyl-N'-phenyl-p-phenylenediamine | 2.0 | 2.0 | 2.0 |
| N-tert-butyl-N-(cyclohexylthio)formamide | | 0.5 | |
| N-tert-butyl-N-(phenylthio)formamide | | | 0.5 |
| Mooney scorch at 135° C.: | | | |
| $t_5$ | 19.8 | 35.0 | 31.5 |
| Percent in scorch delay | | 77 | 59 |
| Rheometer data at 153° C.: | | | |
| $t_2$ | 8.5 | 12.6 | 11.6 |
| $t_{90}-t_2$ | 15.5 | 13.8 | 13.1 |
| Maximum torque | 55.3 | 53.7 | 53.7 |

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. The method of inhibiting premature vulcanization of a sulfur vulcanizable rubber containing a vulcanizing agent selected from the group consisting of sulfur vulcanizing agents and organic peroxide vulcanizing agents which comprises incorporating therein, in an amount effective to inhibit premature vulcanization, an N-(thio)formamide of the formula

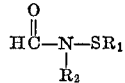

wherein $R_1$ is alkyl of 1 to 20 carbon atoms, aralkyl of 7 to 10 carbon atoms, cycloalkyl of 5 to 12 carbon atoms, or aryl, $R_2$ independently has the same meaning as $R_1$ or is hydrogen.

2. The method according to claim 1 where $R_1$ is composed solely of carbon and hydrogen and $R_2$ is composed solely of carbon and hydrogen or is hydrogen.

3. The method according to claim 1 where the vulcanizing agent is a sulfur vulcanizing agent, the rubber is a diene rubber and contains an organic vulcanization accelerating agent.

4. The method according to claim 3 wherein $R_1$ is aryl or cycloalkyl and $R_2$ is hydrogen, cycloalkyl, alkyl or aralkyl.

5. The method according to claim 4 wherein the vulcanizing agent is elemental sulfur.

6. The method according to claim 5 wherein the organic accelerating agent is a thiazole accelerator, aryl guanidine accelerator or thiocarbonylsulfenamide accelerator.

7. The method according to claim 6 wherein the accelerator is a benzothiazolesulfenamide accelerator.

8. The method according to claim 6 wherein the accelerator is 2-mercaptobenzothiazole.

9. The method according to claim 6 wherein the accelerator is 2,2'-dithiobisbenzothiazole.

10. The method according to claim 6 wherein $R_1$ is phenyl and $R_2$ is cyclohexyl.

11. The method according to claim 6 wherein $R_1$ is phenyl and $R_2$ is tertiary butyl.

12. The method according to claim 6 wherein $R_1$ is cyclohexyl and $R_2$ is tertiary butyl.

13. The method according to claim 6 including the following additional element: heating the mixture at a vulcanizing temperature.

14. Diene rubber vulcanizable compositions having improved resistance to premature vulcanization comprising vulcanizable diene rubber containing a sulfur vulcanizing agent, an organic vulcanization accelerating agent and in amount effective to inhibit premature vulcanization, a compound of the formula

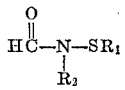

wherein $R_1$ is aryl, alkyl of 1 to 20 carbon atoms, aralkykl of 7 to 10 carbon atoms, or cycloalkyl of 5 to 12 carbon atoms, $R_2$ independently has the same meaning as $R_1$ or is hydrogen.

15. A composition according to claim 14 wherein $R_1$ is aryl or cycloalkyl and $R_2$ is hydrogen, cycloalkyl, alkyl or aralkyl.

16. A composition according to claim 15 wherein the accelerator is a benzothiazolesulfenamide accelerator.

17. A composition according to claim 15 wherein the accelerator is 2,2'-dithiobisbenzothiazole.

References Cited

UNITED STATES PATENTS 3,546,185   12/1970   Coran _____ 260—79.5

JAMES A. SEIDLECK, Primary Examiner

C. A. HENDERSON, Jr., Assistant Examiner

U.S. Cl. X.R.

260—453, 561 S, 780, 785, 788, 793, 797